United States Patent Office 3,001,875
Patented Sept. 26, 1961

3,001,875
METHOD OF EXTRACTING PROTEIN FROM DEFATTED SOYBEAN MATERIAL
Louis Sair, Evergreen Park, Ill., assignor to The Griffith Laboratories, Inc., Chicago, Ill., a corporation of Illinois
No Drawing. Filed May 28, 1956, Ser. No. 587,482
2 Claims. (Cl. 99—17)

The present invention relates to the preparation of modified soy protein to provide a proteinaceous composition useful in preparing various forms of meat. In particular, it relates to the preparation of such a composition having great capacity for emulsifying fat in ground, cured and fresh meat products, and for binding water in such products and also in cured and fresh whole meats.

It is the general object of the present invention to provide a method of deriving from soybeans a protein which derives from the glycinin content thereof, which protein is soluble when used in treating meat.

It is another object of the invention to provide a soluble dry composition for use in treating meats which contains a protein of glycinin origin.

Glycinin is the principal protein of soybean. It is not a definite chemical compound, and its constitution is usually expressed in terms of the analytical content of various amino acids, such as arginine, leucine, lysine, and others. Methods for concentrating it from soybeans are well known. These methods commonly employ soybean meal or flakes, hereinafter referred to as defatted soybean material. This is commonly the residue from extracting soybean oil from flaked bean material by use of volatile solvents. The commercial defatted soybean material may contain a small percentage of residual oil which in no way interferes with processing it to concentrate glycinin therefrom.

Reference is made to my prior Patents No. 2,502,029 and No. 2,502,482, which describe the processing of defatted soybean material to yield a water-insoluble glycinin concentrate. The patents describe the enzymatic hydrolysis of the insoluble glycinin concentrate resulting from such processing, to provide a water-soluble protein for use as a whipping agent in preparing candies, meringue, whipped cream and other foods.

I have discovered that the enzymatic hydrolysis of the glycinin, resulting in smaller molecules of protein, is attended with great reduction in the emulsifying and binding properties which characterize the protein composition of the present invention. In using the protein composition of the present invention in treating meats, the major portion of it should be soluble in the meat or the meat composition. By the present invention, the desired solubility is achieved at a pH suitable for use in meat processing and without reduction in emulsifying capacity as occurs in the enzymatic hydrolysis of glycinin.

My said prior patents disclose processing of defatted soybean material to provide a water-washed wet water-insoluble glycinin concentrate at a pH close to the isoelectric pH of the glycinin content which lies in the approximate range of pH from 4.0 to 4.8, and commonly at pH of 4.4. It is this concentrate which is subjected to enzymatic hydrolysis as aforesaid.

It is a known characteristic of the extracted glycinin at its isoelectric point, that it is rendered soluble by alkali to raise the pH to values upwardly from 6. This is usually accomplished with sodium-base alklalies, and the altered glycinin might be termed "sodium glycininate." To what extent and how the native glycinin of the bean is altered by mild alkali and by heat is unknown and precise knowledge of it is not material to the present invention. Accordingly, the protein extracted from defatted soybean material, and generally referred to as "glycinin," and its forms which result from action of heat and mild alkali up to pH of 10.5, or the combinations thereof, are herein comprehended by the term "glycinin-base protein."

The processing of the present invention may begin with said wet glycinin concentrate having a pH near its isoelectric point. In general, meats of the preferred edible grades have a pH in the vicinity of 5.7 to 6.3, for example, comminuted fresh or cured meats used in preparing loaves, patties, and encased products, and fresh hams to be pickled in a brine bath or by artery pumping to provide either fresh or cured hams. The term "cured" herein signifies the results achieved when using water-soluble nitrites or nitrates. In treating such comminuted and whole meats, water binding agents are important to minimize loss of water on storage in refrigeration, or in processing in the smokehouse. In compounding comminuted meats, emulsification of fat is important and the more perfect the emulsification, the more the fat is prevented from separating as visible fat in the product.

Many agents for emulsification are known, and, with respect to many of them, so much is required that the proportion of meat in the product is lowered. The glycinin-base protein composition of the present invention is comparatively more powerful, and although it may to a lesser degree dilute the meat content, it does not dilute the protein content.

The water-washed wet water-insoluble glycinin concentrate, however it is prepared, is mixed with an edible agent to elevate the pH of the resulting composition to a value in the range from 6 to 10.5, but preferably from 6 to 7.5, for the purpose of imparting solubility to the glycinin-base protein in the treatment of meat. Such solubility need not be complete solubility in water, but only solubility in the saline meat composition in process. The wet insoluble glycinin mass may be mixed with the edible agent without adding water, and the resulting wet mixture may be used promptly in a comminuted meat mass. However, this procedure requires a modification of the meat formulation to account for the water present in the resulting composition. So, it is preferred that such a wet mixture be dried and comminuted to provide a dry powdery composition suitable for use as an ingredient in a standard meat formulation without the necessity of considering such change in water content.

Another method is to use enough water with the insoluble glycinin mass, either wet as prepared or previously dried, and also a pH-raising agent in amount sufficient to effect substantially complete solubility in water. Such a solution is then dried by spraying or other means to provide a dry composition. A modification of this procedure is to use only a fluidizing quantity of water, insufficient to dissolve all of the glycinin-base protein, and a quantity of selected agent to impart a pH in the range of 6 to 10.5, and then spray-dry the viscous fluid mass.

The edible agents for elevating the pH may be alkaline materials or buffering compounds. Among them are sodium carbonate, sodium bicarbonate, sodium hydroxide, trisodium phosphate, disodium phosphate, sodium tripolyphosphate, sodium tetrapyrophosphate and ammonia. Although I have referred more particularly to the sodium compounds, which are more available and useful commercially, it is to be understood that the agent is used in such small amount relative to the amount of meat, that also the corresponding potassium and the ammonium compounds may be used in whole or in part.

The amount of the agent to be used for elevating the pH of the resulting glycinin-base protein composition varies not only with the selection of the particular agent to be used, but also with the final pH which is to be achieved by use of it, within the range 6 to 10.5.

The temperature at which the defatted soybean material is extracted affects the quantity and character of the original glycinin concentrate. The higher the temperature, the slower the curd settles, and the more viscous its solution as measured under standard conditions at pH of 7. A lower temperature of extraction is preferred for mechanical reasons. For higher viscosity, which is attended by greater emulsifying properties, a higher temperature is preferred. Temperatures upwardly from normal room temperature to 180° F. have been used, and are contemplated, although 140° F. is a preferred temperature of extraction, as a compromise of the variable results for yield, ease of operation and emulsifying power.

The following example illustrates the presently preferred procedure.

EXAMPLE 1

| | | |
|---|---|---|
| Defatted soybean flakes | pounds | 5 |
| Water | gallons | 6.75 |
| Soda ash | grams | 23 |
| Sodium sulfite | do | 3.4 |

The flakes are mixed into a solution of the soda ash and the sodium sulfite in the water and the whole warmed to 140° F. and agitated for one hour. It has a pH in the range from 7.4 to 7.6. Then, 230 grams of diatomaceous earth, as filter aid, are added and the mass filtered. The filtrate in the amount of 5 gallons is neutralized to a pH near the isoelectric point, as by adding 80 ml. of concentrated hydrochloric acid to attain a pH of 4.4. A curd forms and rapidly settles. The supernatant liquid is decanted and the curd washed three times with water, each time to bring the volume 5 gallons. The 5-gallon volume has a solids-content of 10.8%. Then the curd is treated to elevate the pH to 7 or above, for example, to 7.3 by adding 46 ml. of 33% by weight caustic soda. On warming to 140° F., the curd all dissolves, and the solution is spray-dried. A light-colored powder with bland taste is an excellent emulsifier for ground meat products. A still lighter-colored product may be obtained by bleaching the yellow-colored impurities with a mild bleaching agent without damage to the glycinin-base protein.

In the above process, it has been found that the temperature of extraction may be varied to affect the emulsifying property. Lowering the temperature from 140° F. increases the solids content of the curd but lowers the emulsifying property per unit of weight. Raising the temperature above 140° F. increases the emulsifying property per unit of weight but lowers the yield. Table I shows the trend.

*Table I*

| Extraction Temperature, ° F. | Solids Content in Percent (5-gallons of curd) | Stormer Viscosity [1] (Seconds) |
|---|---|---|
| 140 | 10.8 | 7 |
| 145 | 8.0 | 8-9 |
| 150 | 6.7 | 28 |
| 180 | 6.5 | (²) |

[1] Neutralized to pH 7.0, agitated at 140° F. at 100 r.p.m. and at 9% solids content.
² Very viscous.

Further, it has been discovered that the emulsifying properties may be enhanced by heating the solubilized extract obtained at a temperature in the range from normal room temperature to 140° F. Thus, by extracting at lower temperatures, the solids content of the curd is greater, although its emulsifying power is lower, but subject to enhancement by heating it at pH values from 6.5 to 10.5. The heating progressively changes a water-dispersion of the curd from opaqueness through a transition state to a translucent viscous state, which is a sort of gel, all of which is evident to the eye when a sufficient quantity of water is present. The dispersion so to be heated may have a pH in the range upwardly from 6.5.

A curd, extracted at 140° F. was neutralized to the pH values given in Table II below by adding caustic soda to a dispersion having 10% solids, and then agitated for 30 minutes at the temperatures given in Table II. The solutions were then allowed to stand and cool overnight to room temperature, and their viscosities were determined by the Stormer method at 100 r.p.m.

*Table II*

| Temperature | Seconds Viscosity—and Character | | |
|---|---|---|---|
| | pH | | |
| | 6.0 | 6.5 | 7.2 |
| 120° F. | Opaque 13.4 | Opaque 8 | Translucent 7.5. |
| 140° F. | Transition 9.1 | Translucent 7.2. | Translucent 7.8. |
| 160° F. | Opaque about to gel 12.1. | Thin gel 10. | Thick gel.[1] |
| 180° F. | Thick gel Partly Opaque 95. | Translucent Heavy gel 32. | Firm gel. |

[1] Too viscous to determine.

All of the products in Table II are good emulsifiers, but those not designated as opaque or transition, which are to the right and below the heavy line, are the best and are preferred. The lack of opacity indicates that all the protein is highly dispersed and in this form it is the better emulsifier.

In dissolving the cured, the upper limit of pH may be as high as 10.5 without detriment to the content of glycinin-base protein, without disadvantage to the meat and the processing thereof, and with advantage in certain circumstances. The content of alkali present in attaining a pH of 10.5 is relatively small and the available acidity of of the meat itself is effective to counteract it and keep the processing of the meat in a pH range near 6.

When a composition of the present invention having a solids content consisting of glycinin-base protein and the pH-adjusting agent is a single ingredient in a ground meat formulation, it is preferred that its pH be not over 7.5. However, when the glycinin-base protein composition of the present invention is present with certain other ingredients, for example as a vehicle, or as a component of a more functional composition, it may be important that the whole composition have a pH higher than 7.5. For example, in my copending application Serial No. 425,725, filed April 26, 1954, I have disclosed solid curing salt compositions for meat containing both alkali metal nitrite and a sodium salt of an isomer of ascorbic acid. Such a solid composition in absorbing moisture from the atmosphere results in hydrolysis of the sodium ascorbate, thus effecting an acid condition which results in release of nitrous acid and loss of ascorbic value. Hence, to stabilize such a composition in its nitrite value as well as in its ascorbic value, a composition having such a combination requires a pH upwardly from 7.6 and it may be as high as 10.5. In consequence, an alkaline agent is used to effect a pH in the range from 7.6 to 10.5.

Therefore, it is possible to make a solid curing-salt composition including the glycinin-base protein composition of the present invention using an alkali content to impart a pH in the range from 7.6 to 10.5, thus to provide solubility for the glycinin-base protein and to stabilize the nitrite content and the ascorbic value. The following exemplifies:

| | Parts by weight | |
|---|---|---|
| Granulated cane sugar | lbs | 3 |
| Potassium nitrate | ozs | 4 |
| Potassium nitrite | ozs | 1 |
| Sodium ascorbate | ozs | 0.5 |
| Potassium carbonate | ozs | 5 |
| Glycinin-base protein at pH of 10.5 | lbs | 2 | pH (1% solution), 10.5.

The following Table III is a standardized frankfurter test formula for measuring the emulsifying properties of protein additives, in terms of fat rendering.

Table III

| | | |
|---|---|---|
| Steer flanks (40% lean and 60% fat) | lbs | 100 |
| Chipped ice | lbs | 30 |
| Sodium chloride | lbs | 2.5 |
| Curing salt [1] | ozs | 4 |
| Seasoning | ozs | 12 |
| Protein emulsifier | | x |

[1] 90% NaCl, 4% NaNO$_3$ and 6% NaNO$_2$.

The ingredients are compounded in the silent cutter in the usual way, stuffed into casings and smoked at 120° F. to 165° F. for 2½ hours. After removal from the smokehouse, they are immersed in water at 160° F. for exactly 2 minutes. Then, after draining, they are immersed in tap water at 40° F. to 50° F. for 1 minute. The rendering of fat is observed after cold storage in a refrigerator. To the extent fat is rendered the chilled fat is observed on the outside of the casing as a light-colored coating or as spots.

Experience shows that when the value of $x$ in the formula is 2 lbs. and there is no decrease in rendering of fat, over a control wherein $x=0$, the emulsifier is a poor one. When $x=2$ and there is no rendering of fat, the emulsifier is an excellent one. Table IV shows the results using several protein emulsifiers.

Table IV

| Item | Agent | $x$ in Table III | Observation |
|---|---|---|---|
| 1 | Control | 0 | Much FR. |
| 2 | Sodium Caseinate | 2 | Do. |
| 3 | Sodium Glycinin-base Protein.[1] | 1 | Slight FR. |
| 4 | do | 2 | No FR. |
| 5 | Glycinin [2] | 2 | Some FR.[3] |
| 6 | Defatted Soy Flour | 4 | FR as in Item (3). |
| 7 | Dry Gel of Table II | 2 | No FR. |

[1] Glycinin curd extracted at 140° F., then solubilized to pH of 7.3, and spray-dried.
[2] Glycinin curd extracted at 140° F. and dried at its pH of 4.2.
[3] But less than in Item (2).
FR=Fat rendering.

From the foregoing, it is clear that commercial glycinin may be elevated in its pH by addition of edible agents to form a glycinin-base protein composition having a pH in the range from 6 to 10.5 for use as a meat-treating composition. The composition may be wet, but preferably it is dry. When the pH is upwardly from 6 so that the protein is substantially all soluble in water, the solution may be dried to form a readily soluble powder for use in meat-treating, and as an ingredient in meat-curing compositions, especially for ground-meat formulations.

I claim:

1. The method comprising dissolving glycinin from defatted soybean material by action of an aqueous solution having a pH in the range from 6 to 10.5 and at a temperature in the range from normal room temperature up to about 140° F., separating the liquid from undissolved solids, precipitating the extracted protein by adding an acidic agent to reduce the pH to the vicinity of the isoelectric pH of the glycinin content which lies in the approximate range of pH from 4.0 to 4.8, washing the resulting precipitated curd with water, adding an edible agent to elevate the pH to a value in the range upwardly from 6.0 in the presence of suspending water, rendering the resulting glycinin-base protein dispersible and the mass a translucent viscous liquid by heating, and dewatering to provide a dry protein mass, said edible agent being selected from the group consisting of edible inorganic alkalies and edible inorganic buffering agents.

2. The method comprising dissolving glycinin from defatted soybean material by action of an aqueous solution having a pH in the range from 6 to 10.5 and at a temperature in the range from normal room temperature up to about 140° F., separating the liquid from undissolved solids, precipitating the extracted protein by adding an acidic agent to reduce the pH to the vicinity of the isoelectric pH of the glycinin content which lies in the approximate range of pH from 4.0 to 4.8, washing the resulting precipitated curd with water, adding an edible agent to elevate the pH to a value in the range upwardly from 6.0 in the presence of suspending water, rendering the resulting glycinin-base protein dispersible and the mass a translucent viscous liquid by heating at a temperature upwardly from 120° F. and dewatering to provide a dry protein mass, said edible agent being selected from the group consisting of edible inorganic alkalies and edible inorganic buffering agents.

References Cited in the file of this patent

UNITED STATES PATENTS 1,955,375    Cone et al. _____ Apr. 17, 1934

FOREIGN PATENTS 746,859    Great Britain _____ Mar. 21, 1956

OTHER REFERENCES

"Soybean and Soybean Products," by Markley, vol. II, Interscience Publishers, Inc., New York, 1951, pp. 954, 985 and 986.